US012792236B2

(12) United States Patent
Kavuluru et al.

(10) Patent No.: US 12,792,236 B2
(45) Date of Patent: Nov. 10, 2026

(54) SYSTEM AND METHODS FOR MEMORY BLOCK ALLOCATION

(71) Applicant: Samsung Electronics Co., Ltd., Suwon-si (KR)

(72) Inventors: Ramachaitanya Kavuluru, Santa Clara, CA (US); Benixon Arul Dhas, Gilroy, CA (US); Harsh Roogi, Pleasanton, CA (US); Somnath Roy, San Ramon, CA (US); Danlin Jia, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 18/830,559

(22) Filed: Sep. 10, 2024

(65) Prior Publication Data

US 2025/0328269 A1 Oct. 23, 2025

Related U.S. Application Data

(60) Provisional application No. 63/635,257, filed on Apr. 17, 2024.

(51) Int. Cl.
*G06F 3/06* (2006.01)

(52) U.S. Cl.
CPC .......... *G06F 3/0631* (2013.01); *G06F 3/0604* (2013.01); *G06F 3/0679* (2013.01)

(58) Field of Classification Search
CPC .... G06F 3/0631; G06F 3/0604; G06F 3/0679; G06F 2212/1044; G06F 12/0246; G06F 2212/7202; G06F 12/0238; G06F 12/023; G06F 3/064; G06F 3/0658; G06F 9/5016; G06F 16/9032; G06F 16/9038; G06F 2201/81; G06F 2212/1016
See application file for complete search history.

(56) References Cited

U.S. PATENT DOCUMENTS

| | | | | |
|---|---|---|---|---|
| 7,430,571 | B2 | 9/2008 | Edwards | |
| 8,621,176 | B2 | 12/2013 | Schindler | |
| 8,762,660 | B2 | 6/2014 | Shaikh et al. | |
| 8,966,191 | B2 | 2/2015 | Flynn et al. | |
| 10,170,151 | B2 | 1/2019 | Aiello et al. | |
| 10,482,023 | B1 * | 11/2019 | LeCrone | H04L 67/1097 |
| 10,915,440 | B2 | 2/2021 | Frolikov | |
| 11,586,385 | B1 | 2/2023 | Lercari et al. | |
| 11,620,214 | B2 | 4/2023 | Jain et al. | |
| 11,656,778 | B2 | 5/2023 | Frolikov | |
| 2016/0011972 | A1 | 1/2016 | Flynn et al. | |
| 2017/0262228 | A1 * | 9/2017 | Kanno | G06F 3/0659 |

(Continued)

OTHER PUBLICATIONS

Extended European Search Report issued in corresponding EP Application No. 25170663.6, dated Sep. 22, 2025 (8 pages).

*Primary Examiner* — Sean D Rossiter
(74) *Attorney, Agent, or Firm* — Womble Bond Dickinson (US) LLP

(57) ABSTRACT

A system and methods for memory block allocation. In some embodiments, a method includes: receiving, from an application, a memory allocation request, the memory allocation request including: a number of blocks, and a first address; determining that memory at the first address is allocated; identifying a second address, differing from the first address by less than a first threshold; and allocating the number of blocks of memory at the second address.

20 Claims, 9 Drawing Sheets

(56) References Cited

U.S. PATENT DOCUMENTS

| | | | |
|---|---|---|---|
| 2021/0349749 | A1 | 11/2021 | Guha |
| 2022/0035669 | A1* | 2/2022 | Fernandez Orellana .................... G06F 9/505 |
| 2022/0083245 | A1 | 3/2022 | Kant et al. |
| 2022/0188028 | A1 | 6/2022 | Mesnier et al. |
| 2023/0064693 | A1* | 3/2023 | Wang .................. G06F 12/0868 |
| 2023/0122533 | A1* | 4/2023 | Zhou .................. G06F 12/0238 711/154 |

* cited by examiner

SYSTEM AND METHODS FOR MEMORY BLOCK ALLOCATION

CROSS-REFERENCE TO RELATED APPLICATION(S)

The present application claims priority to and the benefit of U.S. Provisional Application No. 63/635,257, filed Apr. 17, 2024, entitled "OPTIMAL WRITE EFFICIENT BLOCK ALLOCATOR MECHANISM FOR NONVOLATILE MEMORY EXPRESS (NVME) DRIVES", the entire content of which is incorporated herein by reference.

FIELD

One or more aspects of embodiments according to the present disclosure relate to storage devices, and more particularly to a block allocator.

BACKGROUND

Computing systems may be used for a variety of tasks. A computing system may include a processing circuit (e.g., a central processing unit (CPU)), a main memory, and a storage device. In operation, the computing system may read data from the storage device into the memory, perform data processing operations on the data in the memory, save the results of the data processing operations in the memory, and store, in the storage device, data (e.g., the results of the data processing operations) saved in the memory.

It is with respect to this general technical environment that aspects of the present disclosure are related.

SUMMARY

According to an embodiment of the present disclosure, there is provided a method, including: receiving, from an application, a memory allocation request, the memory allocation request including: a number of blocks, and a first address; determining that memory at the first address is allocated; identifying a second address, differing from the first address by less than a first threshold; and allocating the number of blocks of memory at the second address.

In some embodiments: the memory is nonvolatile memory in a storage device, and the method further includes calculating the first threshold based on the first address and on an input-output size limit of the storage device.

In some embodiments: the memory is nonvolatile memory in a storage device compatible with an interface protocol, the interface protocol provides for reporting of an input-output size limit of the storage device, and the method further includes calculating the first threshold based on the first address and on the input-output size limit.

In some embodiments, the determining that memory at the first address is allocated includes searching a data structure for an entry indexed by the first address.

In some embodiments, the determining that memory at the first address is allocated includes searching a data structure for an entry indexed by the first address, the data structure being configured to be searched in logarithmic time.

In some embodiments: the memory allocation request further includes a second address; and the memory is nonvolatile memory in a storage device, and the method further includes calculating the first threshold based on: the first address, the second address, and an input-output size limit of the storage device.

In some embodiments: the determining that memory at the first address is allocated includes searching a first data structure for an entry indexed by the first address; and the identifying of the second address includes searching a second data structure for an entry indexed by the number of blocks.

In some embodiments: the determining that memory at the first address is allocated includes searching a first data structure for an entry indexed by the first address; the identifying of the second address includes searching a second data structure for an entry indexed by the number of blocks; and the second data structure stores, at an indexed node, one or more addresses of free regions of memory.

According to an embodiment of the present disclosure, there is provided a system, including: a processing circuit; and memory, operatively connected to the processing circuit and storing instructions that, when executed by the processing circuit, cause the system to perform a method, the method including: receiving, from an application, a memory allocation request, the memory allocation request including: a number of blocks, and a first address; determining that memory at the first address is allocated; identifying a second address, differing from the first address by less than a first threshold; and allocating the number of blocks of memory at the second address.

In some embodiments: the memory is nonvolatile memory in a storage device, and the method further includes calculating the first threshold based on the first address and on an input-output size limit of the storage device.

In some embodiments: the memory is nonvolatile memory in a storage device compatible with an interface protocol, the interface protocol provides for reporting of an input-output size limit of the storage device, and the method further includes calculating the first threshold based on the first address and on the input-output size limit.

In some embodiments, the determining that memory at the first address is allocated includes searching a data structure for an entry indexed by the first address.

In some embodiments, the determining that memory at the first address is allocated includes searching a data structure for an entry indexed by the first address, the data structure being configured to be searched in logarithmic time.

In some embodiments: the memory allocation request further includes a second address; and the memory is nonvolatile memory in a storage device, and the method further includes calculating the first threshold based on: the first address, the second address, and an input-output size limit of the storage device.

In some embodiments: the determining that memory at the first address is allocated includes searching a first data structure for an entry indexed by the first address; and the identifying of the second address includes searching a second data structure for an entry indexed by the number of blocks.

In some embodiments: the determining that memory at the first address is allocated includes searching a first data structure for an entry indexed by the first address; the identifying of the second address includes searching a second data structure for an entry indexed by the number of blocks; and the second data structure stores, at an indexed node, one or more addresses of free regions of memory.

According to an embodiment of the present disclosure, there is provided a system, including: a computer-readable medium storing instructions that, when executed by one or more processing circuits, cause the one or more processing circuits to: execute an application, the application being configured to call an allocation request method of a block allocator, the allocation request method taking, as arguments: a number of blocks, and a first address; the computer-readable medium further storing instructions that, when executed by the one or more processing circuits, cause the one or more processing circuits to execute the allocation request method, executing of the allocation request method including: determining that memory at the first address is allocated; identifying a second address, differing from the first address by less than a first threshold; and allocating the number of blocks of memory at the second address.

In some embodiments: the memory is nonvolatile memory in a storage device, and the method further includes calculating the first threshold based on the first address and on an input-output size limit of the storage device.

In some embodiments: the memory is nonvolatile memory in a storage device compatible with an interface protocol, the interface protocol provides for reporting of an input-output size limit of the storage device, and the method further includes calculating the first threshold based on the first address and on the input-output size limit.

In some embodiments, the determining that memory at the first address is allocated includes searching a data structure for an entry indexed by the first address.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
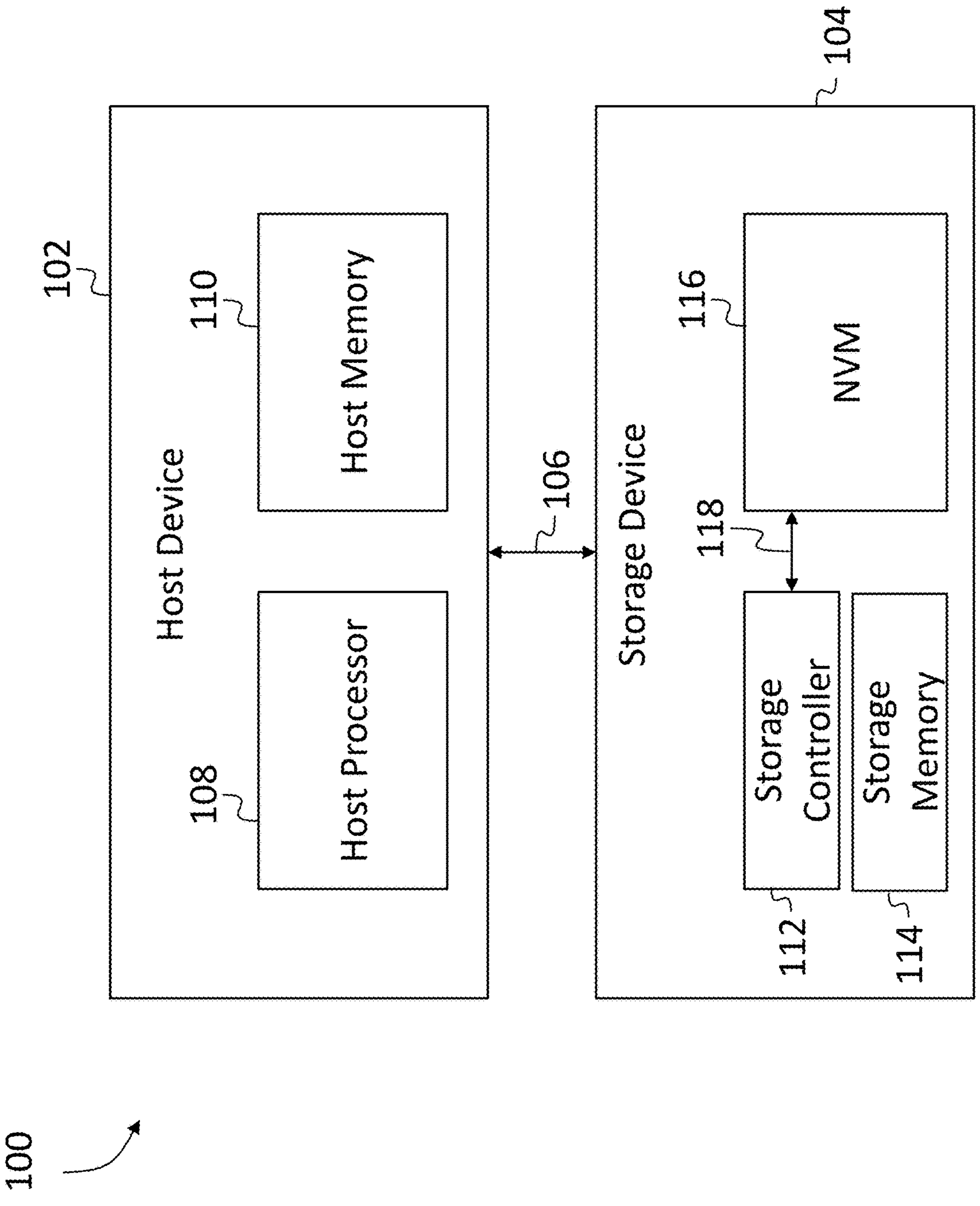
FIG. 1A is a block diagram of a host and a storage device, according to an embodiment of the present disclosure.

The detailed description set forth below in connection with the appended drawings is intended as a description of exemplary embodiments of a block allocator provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a computing system, an application (for example, software running in user space in a host device) may on occasion interact with a storage system to store or retrieve data. The storage system may have characteristics that affect the performance of read and write operations, in a manner that depends on various circumstances. The storage device may be connected to the host device through an interface which exhibits better performance for input output request meeting a certain input-output size limit. For example, a read request that requests data from a set of logical block addresses, each of which falls within a range of logical block addresses smaller than or equal to the input-output size limit may be executed, by the storage device, significantly more quickly than a read request that requests the same volume of data from a set of logical block addresses spanning a range of logical block addresses greater than the input-output size limit. For a Non Volatile Memory Express (NVMe) solid-state drive, for example, the optimal input-output (IO) boundary may be an input-output size limit (e.g., the IO boundary may be with reference to a starting logical block address). The input-output size limit, as used herein, is a limit on the size of an IO operation for efficient operation (and it is not an absolute limit). The storage device may report the input-output size limit. For example, the storage device may have an interface compatible with an interface protocol (for example, NVMe), and the interface protocol may provide for the reporting, by the storage device, of the input-output size limit of the storage device, in response to a query from the host. In some embodiments, the storage device has an interface compatible with a different interface protocol, such as Small Computer System Interface (SCSI), Peripheral Component Interconnect Express (PCIe), Compute Express Link (CXL), remote direct memory access (RDMA) over Ethernet, Serial Advanced Technology Attachment (SATA), Fiber Channel, Serial Attached SCSI (SAS), NVMe over Fabrics (NVMe-oF), or the like.

As such, the performance of the application may be improved if data that will generally be retrieved, or “read”, in a single input-output operation (or “read operation”) are stored within a range of logical block addresses that is smaller than the input-output size limit. In some interfaces, however, no mechanism is available for the application, when making an allocation request from a storage device, to specify a preferred location for the allocation.

A system in which the interface between the application and the storage device allows the application to specify a preferred location for an allocation of storage space may provide improved performance over a system that does not provide such a feature. For example, an application may manage a key-value store, storing identifiers (which may be referred to as “keys”) and, for each key, zero or more values associated with the key. Each key may be used by the system to identify the zero or more values associated with the key; for example, the host device may generate a key (e.g., using a hash function) and (i) store one or more values associated with the key and (ii) retrieve one or more of the values associated with the key. A frequently performed set of operations may include (i) allocating storage space and storing a key at a first address (determined, for example, by hashing the key), (ii) in one or more additional, separate operations, allocating additional storage space and storing a value, or an additional value, associated with the key, and (iii) in a single operation, reading the key and one or more (for example, all) of the values associated with the key. Alternatives to a key-value store may include other data structures, such as tables or heterogeneous structures (which may include groups of fields of different data types). If the key and all of the values associated with the key are stored in a range of logical block addresses that is smaller than the input-output size limit, the reading of the key and one or more (for example, all) of the values associated with the key may be performed more efficiently than if the key and all of the values associated with the key are not stored in a range of logical block addresses that is smaller than the input-output size limit.

As such, in some embodiments, a block allocator exposes an allocation request method that an application may call for the purpose of arranging for certain memory (for example, storage) allocations to be made close to one another if possible. The allocation request method may take two arguments, (i) a size, or "length", and (ii) an address (which may be referred to as a "hint", or a "requested allocation address"), and, when the allocation request method is executed by the block allocator, the block allocator allocates the memory near (for example, within the input-output size limit of) the requested allocation address.

The block allocator may use one or more suitable data structures, stored in memory (e.g., in host memory) for storing lists of available address ranges, to make the identification of a suitable address range available for allocation more efficient. In some embodiments, a first data structure (for example, a first radix tree) is used to store the available address ranges, with nodes indexed by address, and with each node storing the size of the range available at the address. Such a tree may be searched, in O(log n) time (or "logarithmic time"), for a requested allocation address, and, if no node exists at the requested allocation address, or if the range available at the requested allocation address is too small, then the tree may be searched, in O(1) time, for the next or previous node. This may be repeated until (i) a node is found corresponding to an allocation, which, if made, will result in the entire allocated range being within the input-output size limit of the requested allocation address, or (ii) it is determined that no node exists that would allow an allocation to be made such that the entire allocated range is within the input-output size limit of the requested allocation address. As used herein, a "radix" tree may be a tree in which each node that is not a leaf node is connected to at least two child nodes. As used herein, a data structure, such as a radix tree, that is "configured to be searched in logarithmic time" is a data structure the data storage elements of which are capable of being searched using a number of operations proportional to the logarithm of n, where n is the number of data storage elements (e.g., nodes) of the data structure.

In the latter case, i.e., if it is determined that no node exists that would allow an allocation to be made such that the entire allocated range is within the input-output size limit of the requested allocation address, the block allocator (for example, the allocation request method of the block allocator) may perform a search of a second data structure, searching the remaining available address ranges for one that is sufficiently large to accommodate the allocation request. The second data structure may be a second radix tree, in which each node is indexed by a size, and each node contains a data structure listing the addresses of all of the available ranges of that size. The data structures at the nodes may also be radix trees. When performing the search of the second data structure, the block allocator may first search for the size specified in the call to the allocation request method (a search that, for a radix tree, may be performed in O(n) time), and if no node exists for that size, it may search for a next node (which for a radix tree, may be performed in O(1) time). If a next node exists, then it will identify at least one address at which an available address range of sufficient size exists, and the block allocator may then allocate a range at this address, or within this available address range. If no next node exists, then the allocation request method of the block allocator may return a value (for example, "false" or "NULL") indicating that the allocation failed.

FIG. 1A illustrates a system, which may be referred to as a "target" 100, according to some embodiments of the present disclosure. Referring to FIG. 1A, the target 100 may include a host device 102 and a storage device 104 (which may be a persistent storage device 104). In some embodiments, the host device 102 may be housed with the storage device 104, and in other embodiments, the host device 102 may be separate from the storage device 104. The host device 102 may include any suitable computing device connected to a storage device 104 such as, for example, a personal computer (PC), a portable electronic device, a hand-held device, a laptop computer, or the like.

The host device 102 may be connected to the storage device 104 over a host interface 106. The host device 102 may issue data request commands or input-output (IO) commands (for example, read or write commands) to the storage device 104 over the host interface 106, and may receive responses from the storage device 104 over the host interface 106.

The host device 102 may include a host processor 108 and host memory 110. The host processor 108 may be a processing circuit (discussed in further detail below), for example, such as a general-purpose processor or a central processing unit (CPU) core of the host device 102. The host processor 108 may be connected to other components via an address bus, a control bus, a data bus, or the like. The host memory 110 may be considered as high performing main memory (for example, primary memory) of the host device 102. For example, in some embodiments, the host memory 110 may include (or may be) volatile memory, for example, such as dynamic random-access memory (DRAM). However, the present disclosure is not limited thereto, and the host memory 110 may include (or may be) any suitable high performing main memory (for example, primary memory) replacement for the host device 102 as would be known to those skilled in the art. For example, in other embodiments, the host memory 110 may be relatively high performing non-volatile memory, such as NAND flash memory, Phase Change Memory (PCM) (a type of memory that stores information using, in each memory cell, a change in resistance that accompanies a phase change in a material (e.g., a chalcogenide) in the cell), Resistive RAM (a type of memory in which a current through a controllable resistor (or "memristor") changes its resistance, to store information), Spin-transfer Torque RAM (STTRAM) (a memory in which a spin-polarized current may be used to change the magnetization of a magnetic layer of a memory cell), any suitable memory based on PCM technology, or resistive random access memory (ReRAM), and may include, for example, or the like.

The storage device 104 may operate as secondary memory that may persistently store data accessible by the host device 102. In this context, the storage device 104 may include relatively slower memory when compared to the high performing memory of the host memory 110. For example, in some embodiments, the storage device 104 may be secondary memory of the host device 102, for example, such as a Solid-State Drive (SSD). However, the present disclosure is not limited thereto, and in other embodiments, the storage device 104 may include (or may be) any suitable storage device such as, for example, a magnetic storage device (for example, a hard disk drive (HDD), or the like), an optical storage device (for example, a Blue-ray disc drive, a compact disc (CD) drive, a digital versatile disc (DVD) drive, or the like), other kinds of flash memory devices (for example, a USB flash drive, and the like), or the like. In various embodiments, the storage device 104 may conform to a large form factor standard (for example, a 3.5-inch hard drive form-factor), a small form factor standard (for example, a 2.5 inch hard drive form-factor), an M.2 form factor, an E1.S form factor, or the like. In other embodiments, the storage device 104 may conform to any suitable or desired derivative of these form factors. For convenience, the storage device 104 may be described hereinafter in the context of a solid-state drive, but the present disclosure is not limited thereto.

The storage device 104 may be communicably connected to the host device 102 over the host interface 106. The host interface 106 may facilitate communications (for example, using a connector and a protocol) between the host device 102 and the storage device 104. In some embodiments, the host interface 106 may facilitate the exchange of storage requests (or "commands") and responses (for example, command responses) between the host device 102 and the storage device 104. In some embodiments, the host interface 106 may facilitate data transfers by the storage device 104 to and from the host memory 110 of the host device 102. For example, in various embodiments, the host interface 106 (for example, the connector and the protocol thereof) may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabrics (NVMe-oF), or the like. In other embodiments, the host interface 106 (for example, the connector and the protocol thereof) may include (or may conform to) various general-purpose interfaces, for example, such as Ethernet, Universal Serial Bus (USB), and/or the like.

In some embodiments, the storage device 104 may include a storage controller 112, storage memory 114 (which may also be referred to as a buffer), non-volatile memory (NVM) 116, and a storage interface 118. The storage memory 114 may be high-performing memory of the storage device 104, and may include (or may be) volatile memory, for example, such as DRAM, but the present disclosure is not limited thereto, and the storage memory 114 may be any suitable kind of high-performing volatile or non-volatile memory. The non-volatile memory 116 may persistently store data received, for example, from the host device 102. The non-volatile memory 116 may include, for example, NAND flash memory, but the present disclosure is not limited thereto, and the non-volatile memory 116 may include any suitable kind of memory for persistently storing the data according to an implementation of the storage device 104 (for example, magnetic disks, tape, optical disks, or the like).

The storage controller 112 may be connected to the non-volatile memory 116 over the storage interface 118. In the context of the SSD, the storage interface 118 may be referred to as flash channel, and may be an interface with which the non-volatile memory 116 (for example, NAND flash memory) may communicate with a processing component (for example, the storage controller 112) or other device. Commands such as reset, write enable, control signals, clock signals, or the like may be transmitted over the storage interface 118. Further, a software interface may be used in combination with a hardware element that may be used to test or verify the workings of the storage interface 118. The software may be used to read data from and write data to the non-volatile memory 116 via the storage interface 118. Further, the software may include firmware that may be downloaded onto hardware elements (for example, for controlling write, erase, and read operations).

The storage controller 112 (which may be a processing circuit (discussed in further detail below)) may be connected to the host interface 106, and may manage signaling over the host interface 106. In some embodiments, the storage controller 112 may include an associated software layer (for example, a host interface layer) to manage the physical connector of the host interface 106. The storage controller 112 may respond to input or output requests received from the host device 102 over the host interface 106. The storage controller 112 may also manage the storage interface 118 to control, and to provide access to and from, the non-volatile memory 116. For example, the storage controller 112 may include at least one processing component embedded therein for interfacing with the host device 102 and the non-volatile memory 116. The processing component may include, for example, a general purpose digital circuit (for example, a microcontroller, a microprocessor, a digital signal processor, or a logic device (for example, a field programmable gate array (FPGA), an application-specific integrated circuit (ASIC), or the like)) capable of executing data access instructions (for example, via firmware or software) to provide access to the data stored in the non-volatile memory 116 according to the data access instructions. For example, the data access instructions may correspond to the data request commands, and may include any suitable data storage and retrieval algorithm (for example, read, write, or erase) instructions, or the like.

Figure 1B:
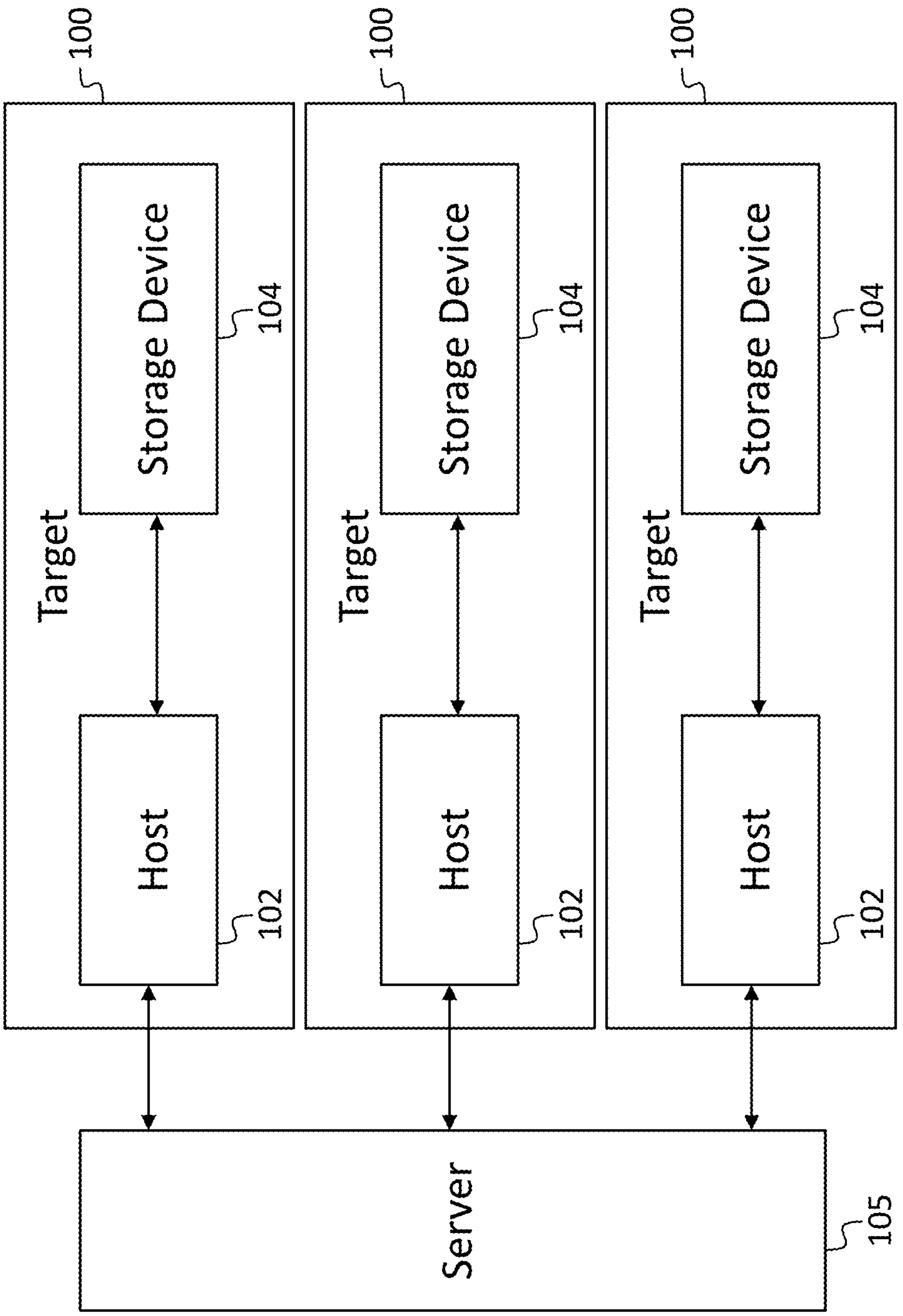
FIG. 1B is a system level block diagram, according to an embodiment of the present disclosure.

FIG. 1B is a system-level diagram, in some embodiments. Within each target 100, a host 102 is connected to a persistent storage device 104 (which may be, for example, a solid-state drive (SSD)). The persistent storage device 104 may have (as discussed above) a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface (which may be referred to as a "host interface"), through which it may be connected to the host 102, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS) or Universal Flash Storage (UFS). The persistent storage device 104 may include an interface circuit which operates as an interface adapter between the host interface 106 and one or more internal interfaces in the persistent storage device 104.

The host interface may be used by the host 102 to communicate with the persistent storage device 104, for example, by sending write and read commands, which may be received, by the persistent storage device 104, through the host interface. The host interface may also be used by the persistent storage device 104 to perform data transfers to and from system memory of the host 102.

Such data transfers may be performed using direct memory access (DMA). For example, when the host 102 sends a write command to the persistent storage device 104, the persistent storage device 104 may fetch the data to be written to the non-volatile memory 116 from the host memory 110 of the host device 102 using direct memory access, and the persistent storage device 104 may then save the fetched data to the non-volatile memory 116. Similarly, if the host 102 sends a read command to the persistent storage device 104, the persistent storage device 104 may read the requested data (i.e., the data specified in the read command) from the non-volatile memory 116 and save it in the host memory 110 of the host device 102 using direct memory access. The persistent storage device 104 may store data in a persistent memory, for example, not-AND (NAND) flash memory, for example, in memory dies containing memory cells, each of which may be, for example, a Single-Level Cell (SLC), a Multi-Level Cell (MLC), or a Triple-Level Cell (TLC).

A Flash Translation Layer (FTL) (discussed in further detail below) of the persistent storage device 104 may provide a mapping between logical addresses used by the host 102 and physical addresses of the data in the persistent memory. The persistent storage device 104 may also include (i) a buffer which may include (for example, consist of) dynamic random-access memory (DRAM), and (ii) a persistent memory controller (for example, a flash controller) for providing suitable signals to the persistent memory. Some or all of the host interface, the Flash Translation Layer, the buffer, and the persistent memory controller may be implemented in a processing circuit, which may be referred to as the persistent storage device controller.

Figure 1C:
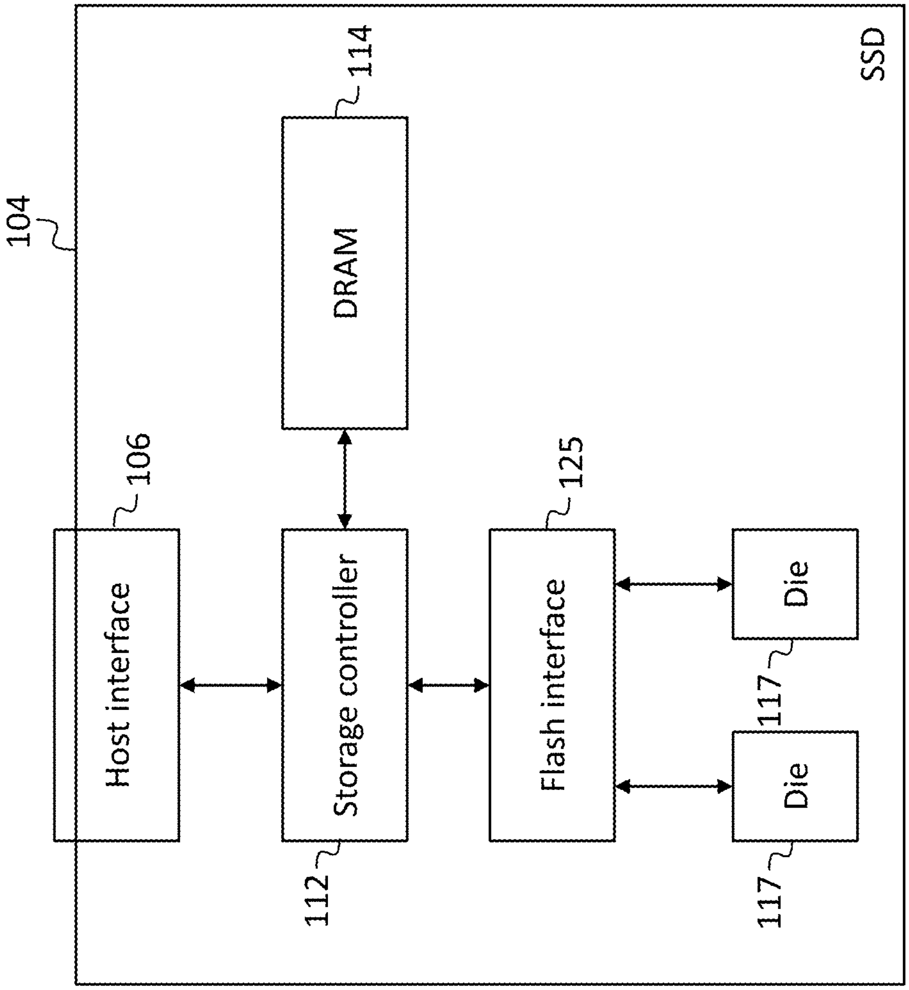
FIG. 1C is a block diagram of a storage device, according to an embodiment of the present disclosure.

FIG. 1C is a block diagram of a persistent storage device 104 (for example, a solid-state drive), in some embodiments. The host interface 106 is used by the host 102, to communicate with the persistent storage device 104. The data write and read input output commands, as well as various media management commands such as the Nonvolatile Memory Express (NVMe) Identify command and the NVMe Get Log command may be received, by the persistent storage device 104, through the host interface 106. In some embodiments, the storage device has an interface compatible with a different interface protocol, such as Small Computer System Interface (SCSI), Peripheral Component Interconnect Express (PCIe), Compute Express Link (CXL), remote direct memory access (RDMA) over Ethernet, Serial Advanced Technology Attachment (SATA), Fiber Channel, Serial Attached SCSI (SAS), NVMe over Fabrics (NVMe-oF), or the like. Ini such embodiments, commands that are similar, identical, or analogous to the Identify command or the Get Log command may be received by the persistent storage device 104, through the host interface 106. The host interface 106 may also be used by the persistent storage device 104 to perform data transfers to and from host system memory. The persistent storage device 104 may store data in non-volatile memory 116 (for example, not-AND (NAND) flash memory), for example, in memory dies 117 containing memory cells, each of which may be (as discussed above), for example, a Single-Level Cell (SLC), a Multi-Level Cell (MLC), or a Triple-Level Cell (TLC). A Flash Translation Layer (FTL), which may be implemented in the storage controller 112 (for example, based on firmware (for example, based on firmware stored in the non-volatile memory 116) may provide a mapping between logical addresses used by the host and physical addresses of the data in the non-volatile memory 116. The persistent storage device 104 may also include (i) a buffer (for example, the storage memory 114) (which may include, for example, consist of, dynamic random-access memory (DRAM)), and (ii) a flash interface (or "flash controller") 125 for providing suitable signals to the memory dies 117 of the non-volatile memory 116. Some or all of the host interface 106, the Flash Translation Layer (as mentioned above), the storage memory 114 (for example, the buffer), and the flash interface 125 may be implemented in a processing circuit, which may be referred to as the persistent storage device controller 112 (or simply as the storage controller 112).

The NAND flash memory may be read or written at the granularity of a flash page, which may be between 8 KB and 16 KB in size. Before the flash memory page is reprogrammed with new data, it may first be erased. The granularity of an erase operation may be one NAND block, or "physical block", which may include, for example, between 128 and 256 pages. Because the granularity of erase and program operations are different, garbage collection (GC) may be used to free up partially invalid physical blocks and to make room for new data. The garbage collection operation may (i) identify fragmented flash blocks, in which a large proportion (for example, most) of the pages are invalid, and (ii) erase each such physical block. When garbage collection is completed, the pages in an erased physical block may be recycled and added to a free list in the Flash Translation Layer.

The non-volatile memory 116 (for example, if it includes or is flash memory) may be capable of being programmed and erased only a limited number of times. This may be referred to as the maximum number of program/erase cycles (P/E cycles) the non-volatile memory 116 can sustain. To maximize the life of the persistent storage device 104, the persistent storage device controller 112 may endeavor to distribute write operations across all of the physical blocks of the non-volatile memory 116; this process may be referred to as wear leveling.

A mechanism that may be referred to as "read disturb" may reduce persistent storage device 104 reliability. A read operation on a NAND flash memory cell may cause the threshold voltage of nearby unread flash cells in the same physical block to change. Such disturbances may change the logical states of the unread cells, and may lead to uncorrectable error-correcting code (ECC) read errors, degrading flash endurance. To avoid this result, the Flash Translation Layer may have a counter of the total number of reads to a physical block since the last erase operation. The contents of the physical block may be copied to a new physical block, and the physical block may be recycled, when the counter exceeds a threshold (for example, 50,000 reads for Multi-Level Cell), to avoid irrecoverable read disturb errors. As an alternative, in some embodiments, a test read may periodically be performed within the physical block to check the error-correcting code error rate; if the error rate is close to the error-correcting code capability, the data may be copied to a new physical block.

As mentioned above, in some embodiments, a block allocator includes an allocation request method that may be called by an application to request a memory allocation (for example, an allocation of nonvolatile memory in a solid-state drive (SSD), for example, in an NVMe SSD). The application may make a memory allocation request (or "allocation request") by calling the allocation request method, and the allocation request may include (i) a number of blocks (i.e., the size of the requested allocation, in blocks) and (ii) an address (which may be the "hint", i.e., an address at or near which the application requests the allocation to be made). In some embodiments, the storage device has an interface compatible with an interface protocol different from NVMe, such as Small Computer System Interface (SCSI), Peripheral Component Interconnect Express (PCIe), Compute Express Link (CXL), remote direct memory access (RDMA) over Ethernet, Serial Advanced Technology Attachment (SATA), Fiber Channel, Serial Attached SCSI (SAS), NVMe over Fabrics (NVMe-oF), or the like. Ini such embodiments, requests that are similar, identical, or analogous to the NVMe allocation request may be made.

Figure 2A:
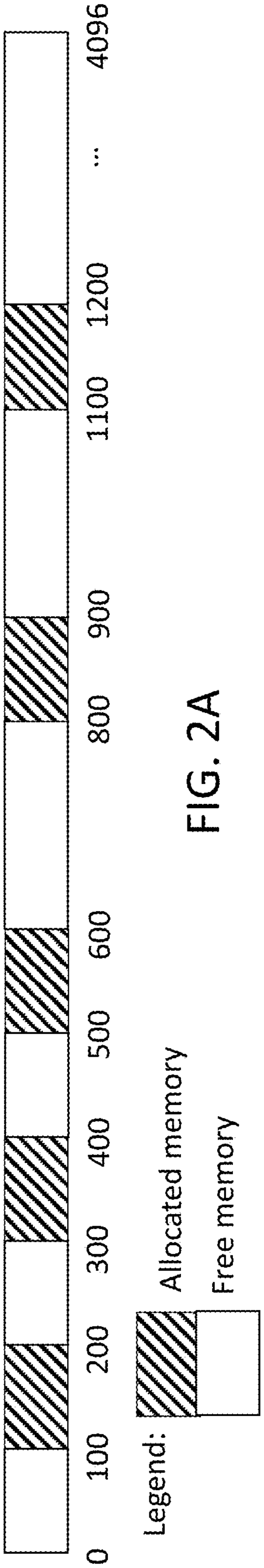
FIG. 2A is a diagram of allocated and free memory in a storage device, according to an embodiment of the present disclosure.
Figure 2B:
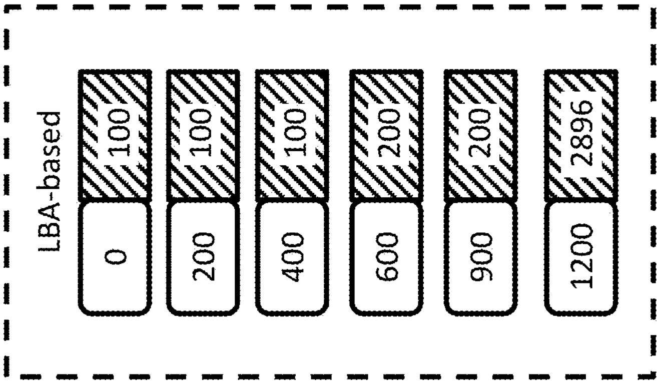
FIG. 2B is a diagram of a first data structure, according to an embodiment of the present disclosure.
Figure 2C:
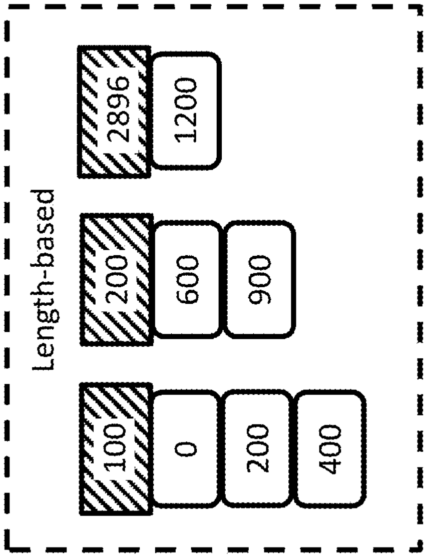
FIG. 2C is a diagram of a second data structure, according to an embodiment of the present disclosure.

In executing the allocation request method, the block allocator may use two data structures. FIG. 2A is a diagram of free and allocated memory, in an example used to illustrate the data structures used by the block allocator. FIG. 2B shows a first data structure for storing the free ranges, in which the free ranges are listed in order of address (for example, logical block address (LBA)). FIG. 2C shows a second data structure for storing the free ranges, in which the free ranges are listed in order of size. For each size (for example, 100 blocks, 200 blocks, or 2896 blocks, the second data structure contains a data structure storing a list of addresses (for example, logical block addresses) at which an address range of the given size is available. In some embodiments, each of the data structures (for example, the first data structure, the second data structure, and each of the data structures at the nodes of the second data structure), is a data structure that can be searched in O(log n) time, for example, a tree, such as a radix tree. In some embodiments, one or more of the data structures is a different structure, for example, a balanced binary search tree, or an unbalanced binary search tree, or a hash table.

Figure 3A:
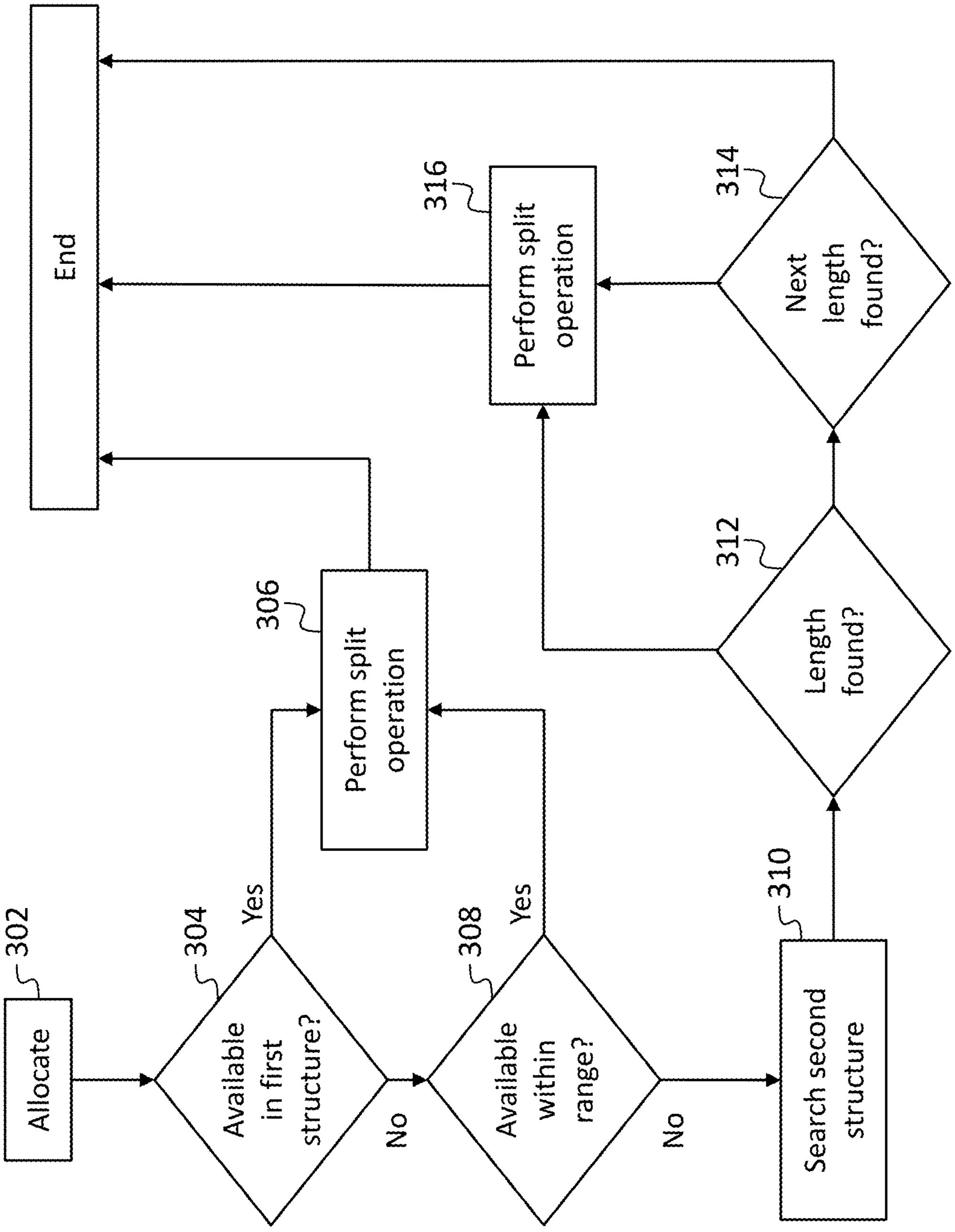
FIG. 3A is a flow chart of an allocation, according to an embodiment of the present disclosure.

FIG. 3A is a flowchart for the allocation request method, in some embodiments. When, at 302, the block allocator receives the allocation request (for example, when the allocation request method is called by the application), the block allocator may (i) search, at 304, the first data structure (for example, the first radix tree) for the requested allocation address, and (ii) if the block allocator finds a node at the requested allocation address containing an available address range of sufficient size, the block allocator may allocate the available address range to the application, and perform, at 306, a split operation (discussed in further detail below). If the block allocator does not find a node of sufficient size, the block allocator may repeatedly search, in the first data structure, for the next node (for example, in order of increasing address) until (i) the block allocator finds an available address range of sufficient size or (ii) the difference between the address and the requested allocation address exceeds a first threshold.

The block allocator may also (either before or after the repeated searches for the next node) repeatedly search the first data structure for the previous node (for example, in order of decreasing address) until (i) the block allocator finds an available address range of sufficient size or (ii) the difference between the requested allocation address and the address exceeds a first threshold. If during any of the searches the block allocator finds an available address range of sufficient size, the set of searches may terminate and the block allocator may allocate the available address range to the application, and perform, at 306, a split operation. If the block allocator does not find an available address range of sufficient size in either (i) the searches of one or more next nodes or (ii) the searches of one or more previous nodes, it proceeds, at 310 to a search of the second data structure.

The searching of the second data structure may include, searching, at 312, for the length specified in the allocation request, and, if the length specified in the allocation request is not found, searching, at 314, for the next node. If the block allocator finds a free address range as a result of either searching, at 312, for the length specified in the allocation request, or searching, at 314, for the next node, the block allocator may allocate the available address range to the application, and perform, at 316, a split operation.

The threshold may be selected to be equal to (i) the input-output size limit less the number of blocks requested, by the application, in the allocation request, or (ii) in an embodiment in which the allocation request method takes additional arguments (discussed in further detail below), the input-output size limit less the number of blocks requested, by the application, in the allocation request, and less one half the size of a previously made allocation at the requested allocation address.

Figure 3B:
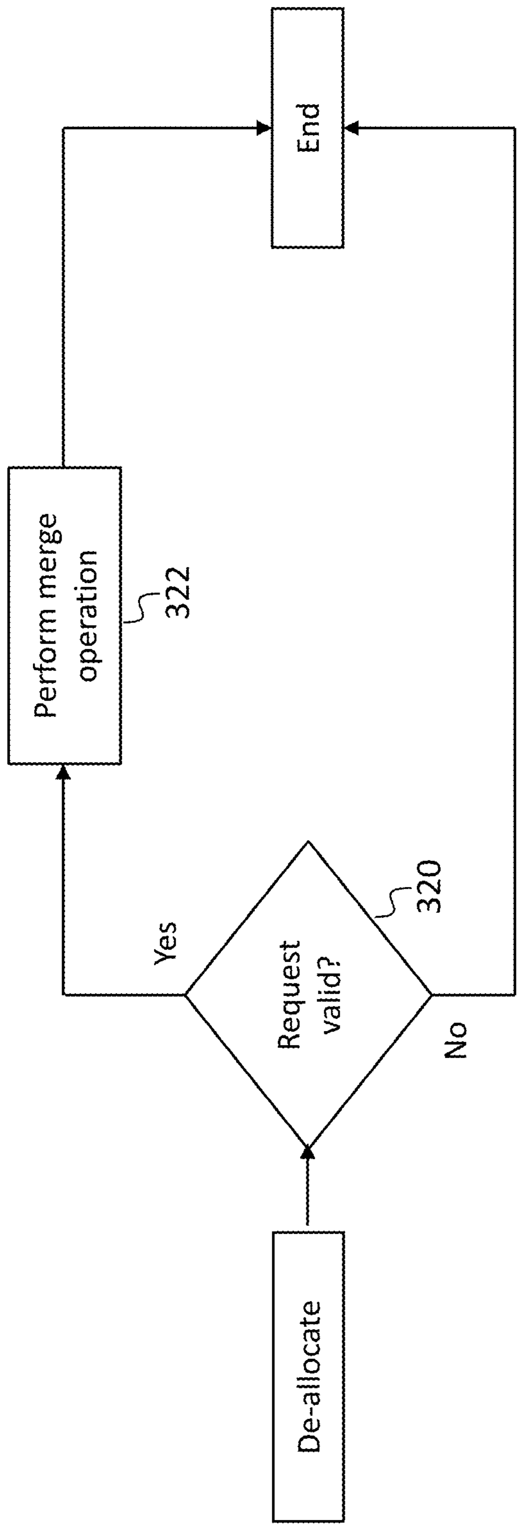
FIG. 3B is a flow chart of a de-allocation, according to an embodiment of the present disclosure.

FIG. 3B is a flowchart for a de-allocate method, that the application may call, with a first argument specifying an address (for example, a logical block address) and a second argument specifying a length, when it no longer needs previously allocated memory. The method includes determining, at 320, whether the request is valid (for example, whether the address range specified by the address and the length is in fact allocated); if the request is valid, then, at 322, the block allocator performs a merge operation (discussed in further detail below) and returns with a flag (for example, "true") indicating success, and if the request is not valid, then the block allocator returns with a flag (for example, "false") indicating failure.

Figure 3C:
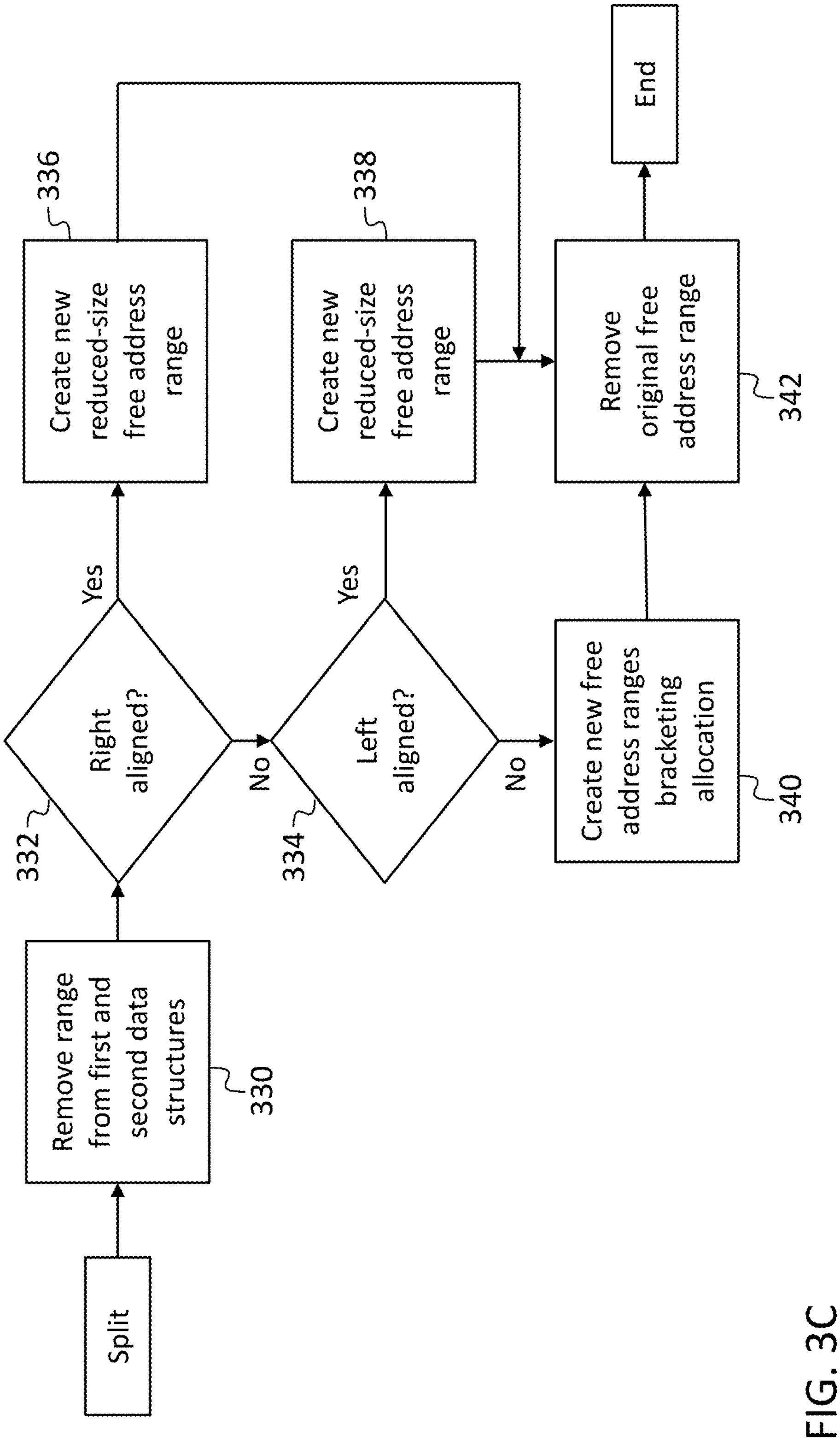
FIG. 3C is a flow chart of a split operation, according to an embodiment of the present disclosure.

FIG. 3C is a flowchart for the split operation, which may be an operation for updating the data structures when a new allocation is made, for example, removing, at 330, the allocated address range from the data structures. This may be performed as follows. At 332 and 334, it may be determined whether the address range being allocated is left aligned or right aligned (with the free address range from which the allocation is made), respectively. If it is either left aligned or right aligned, then at 336 or 338, respectively, a new free address range is created (consisting of the remaining unallocated portion of the free address range from which the allocation is made), and, if the allocation is neither left aligned nor right aligned and instead splits the free address range from which the allocation is made into two portions, then new free address ranges corresponding to the two portions are added, at 340, to the data structures. At 342, the free address range from which the allocation is made is deleted from the data structures.

Figure 3D:
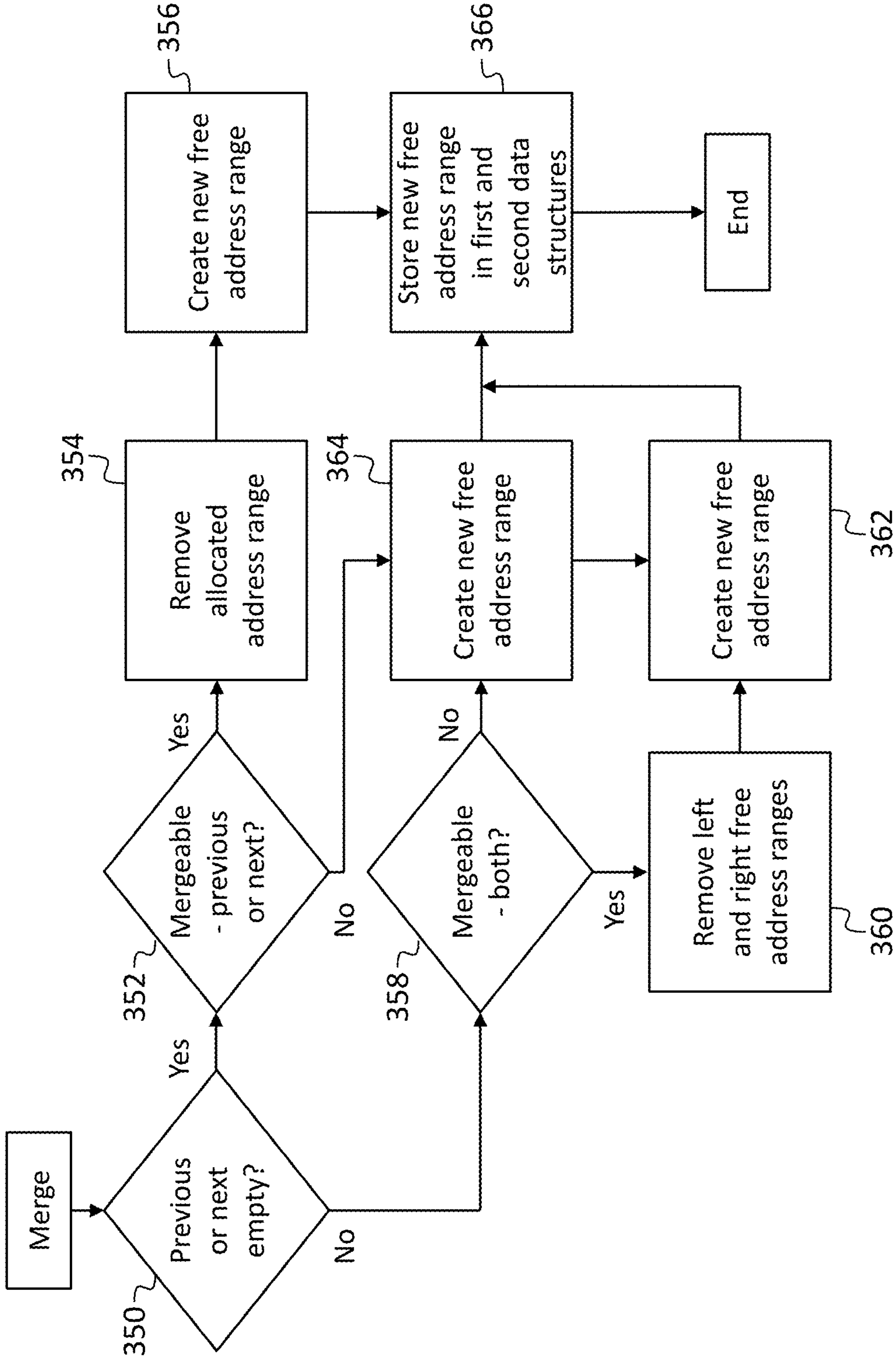
FIG. 3D is a flow chart of a merge operation, according to an embodiment of the present disclosure.

FIG. 3D is a flowchart for the merge operation, which may be an operation for updating the data structures when a de-allocation is made. The operation includes, determining, at 350, whether the previous or next address range is empty, and, if it is, determining, at 352, whether the address range being de-allocated is mergeable with (e.g., contiguous with) the previous or next address range that is empty. If it is, then the address range being de-allocated is removed, at 354, and a new address range is created, at 356, consisting of the address range being de-allocated and the adjacent address range.

If, at 350, it is determined that the previous or next address range is not empty, then at 358 it is determined whether the address range being de-allocated is mergeable with (e.g., contiguous with) free address ranges on both sides. If it is, then, at 360, the free address ranges on both sides of the address range being de-allocated are removed from the data structures, and a new address range is created, at 362, consisting of the address range being de-allocated and the adjacent address ranges. If, at 358, it is determined that the address range being de-allocated is not mergeable with free address ranges on both sides, then a new address range is created, at 364, consisting of the address range being de-allocated. At 366, the new free address range is then stored in the data structures.

In some embodiments, as mentioned above, the allocation request method may take more than two arguments, for example, it may be called with Allocate (hint_pref_1, hint_pref_2, num_blocks)

where hint_pref_1 is a first requested allocation address (a first hint), hint_pref_2 is a second requested allocation address (a second hint), and num_blocks is the requested number of blocks. All the hints may be subject to priority. While the block allocator may attempt to allocate close to hint_pref_1, it may use hint_pref_2 in the allocation strategy to reinforce best effort for the input-output size limit. In some embodiments, the allocation request method may take, as arguments, additional hints, for example, hint_pref_1, hint_pref_2, hint_pref_3 and so on, ordered according to priority, and the block allocator may use these hints to allocate in the order of precedence. In some embodiments, the allocation request method takes as arguments a list and a requested number of blocks, the list including a set of ordered pairs, each ordered pair specifying an already made allocation (for example, as {start_LBA, end_LBA} or as {start_LBA, length}), the already made allocations, and the newly requested allocation, being, together, a group of allocations that (i) (like the allocations for a key and for each of its values) are likely to be accessed as a group, and that (ii) therefore should be stored, if possible, within an address range no greater than the input-output size limit.

Some embodiments include a software framework for a block allocator that allows the flexibility for modifying underlying allocator type. Some embodiments use a bitmap allocator, where all logical blocks on the drive are represented as bits in a bitmap. The software framework may allow modifying or interspersing different types of allocators. As an example, for a 1 terabyte (TB) drive, the first 500 gigabytes (GB) can be represented as a bitmap-based allocator and next 500 GB can be managed by a doubly-linked list type allocator.

In some embodiments, the block allocator has a documented applications programing interface (API) and is designed as a pluggable module that can be integrated with any application.

Some embodiments include a low disk input-output (IO) sensitive allocation strategy. On an allocation request for 'n' blocks and a hint address, the block allocator may attempt to find 'n' consecutive free blocks from the hint address on either side within the input-output size limit (or optimal IO boundary). This may result in requiring only a single disk IO (and no transaction). On failing this strategy, the fallback option may be to find 'n' consecutive free blocks from anywhere in the memory with a number of free blocks closest to, and at least as great as, the requested length ('n'). This approach may reduce fragmentation. This approach may also require only a single disk IO from the block allocator perspective, but, since it may not be able to obtain blocks within the input-output size limit of the hint LBA, the application may need to use a transaction to persist all of its meta data.

If 'n' consecutive blocks are not available, the block allocator may split the length in an optimal way to build a minimum length scatter gather list within the same write granularity from the hint address if possible. If the length of the scatter gather list crosses a threshold, the block allocator may treat the IO as failed, and start garbage collection for defragmentation, if the drive is not too full.

Some embodiments include scatter-gather and managing of fragmentation. There are different configurable strategies that the block allocator may utilize to address fragmentation. The block allocator may scatter a data request into multiple smaller chunks of equal length and honor the request only if each of the smaller data chunks can be allocated contiguously. Scattering or splitting of data into smaller data chunks of equal sizes may occur until a configurable threshold; upon unsuccessful allocation of all split data chunks, the request may be treated as failed. Upon heavy fragmentation a background garbage collecting module may re-shuffle data based on a configurable threshold. Another approach is to allow applications to manage fragmentation outside of the block allocator and use the block allocator for allocating contiguous memory. This approach may facilitate the scaling out of the block allocator across different drives.

Some embodiments include persistence support for the block allocator. The block allocator may use an IO-ordering strategy based on disjoint memory ranges to allow parallel persistence to the drive (for example, to the nonvolatile storage). Each IO request upon completion may also persist the block allocator meta-data on the drive.

Some embodiments include multi-threading support for the block allocator. 'Allocate' and Free' operations supported by the block allocator may not be thread safe. A design in which this is the case relieves the design from the need to build central processing unit (CPU)-intensive synchronization primitives and improves performance. The application may be responsible for managing its concurrency and synchronization policies. However, the application may have concurrent 'read' or 'write' operations after validating that the contested regions are disjoint. The block allocator may expose a 'status' API to validate whether a region is being modified.

In some embodiments, power savings may be achieved on the SSD through the use of a block allocator as described herein.

Figure 4:
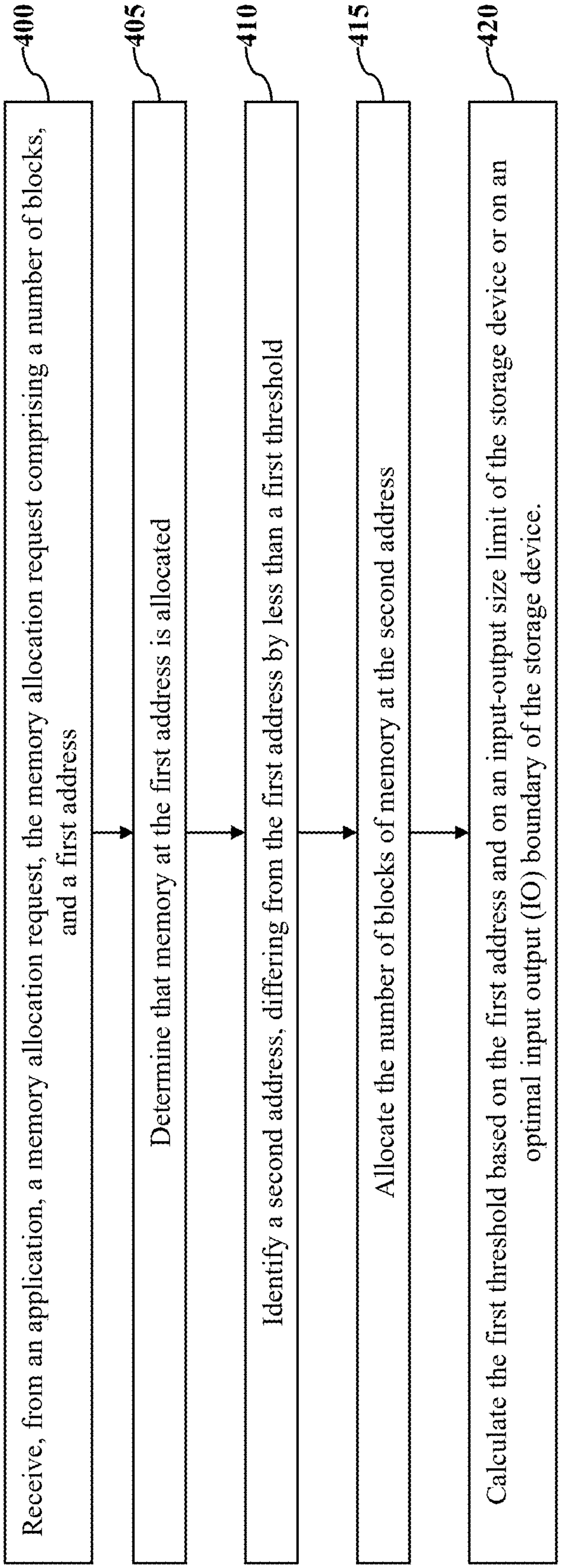
FIG. 4 is a flow chart of a method for allocating, according to an embodiment of the present disclosure.

FIG. 4 shows a method for allocating, in some embodiments. Although FIG. 4 illustrates various operations in a method for allocating, embodiments according to the present disclosure are not limited thereto. For example, according to some embodiments, a method for allocating may include addition operations or fewer operations, or the order of operations may vary (unless otherwise explicitly stated or implied) without departing from the spirit and scope of embodiments according to the present disclosure.

The method of FIG. 4 includes: receiving, at 400, from an application, a memory allocation request, the memory allocation request including: a number of blocks, and a first address. For example, as discussed above in the context of FIG. 3A, an application may call an allocation request method of the block allocator, passing in as arguments a requested allocation address and a requested length.

The method further includes determining, at 405, that memory at the first address is allocated. For example, as discussed above in the context of FIG. 3A, the block allocator may perform a search of the first data structure, using the requested allocation address as the index for the search, and determine that no entry exists for this index, in the first data structure.

The method further includes identifying, at 410, a second address, differing from the first address by less than a first threshold. For example, as discussed above in the context of FIG. 3A, the block allocator may perform one or more searches for the next node or for the previous node, in the first data structure, and determine that a node exists corresponding to a free address range having a size at least as great as the requested length, where the index of the node is an address differing from the requested allocation address by less than the first threshold.

The method further includes allocating, at 415, the number of blocks of memory at the second address. For example, as discussed above in the context of FIG. 3A, having found the node, in the first data structure, with both (i) an address within the first threshold of the requested allocation address and (ii) a size at least equal to the requested length, the block allocator may allocate, to the application, memory spanning a range of addresses, of a size equal to the requested length and starting at an address equal to the requested allocation address.

In some embodiments: the memory is nonvolatile memory in a storage device, and the method further includes calculating, at 420, the first threshold based on the first address and on an input-output size limit. For example, the first threshold may be calculated by subtracting the requested length from the input-output size limit. In some embodiments: the memory is nonvolatile memory in a storage device, and the method further includes calculating the first threshold based on the first address and on an optimal input output (IO) boundary of the storage device. In some embodiments, the determining that memory at the first address is allocated includes searching a data structure for an entry indexed by the first address. In some embodiments, the determining that memory at the first address is allocated includes searching a radix tree for an entry indexed by the first address.

In some embodiments: the memory allocation request further includes a second address; and the memory is nonvolatile memory in a storage device, and the method further includes calculating the first threshold based on: the first address, the second address, and an optimal input output (IO) boundary. In some embodiments, the determining that memory at the first address is allocated includes searching a first data structure for an entry indexed by the first address; and the identifying of the second address includes searching a second data structure for an entry indexed by the number of blocks. In some embodiments, the determining that memory at the first address is allocated includes searching a first data structure for an entry indexed by the first address; the identifying of the second address includes searching a second data structure for an entry indexed by the number of blocks; and the second data structure stores, at an indexed node, one or more addresses of free regions of memory.

Although some examples described herein relate to Nonvolatile Memory Express solid-state drives, the present disclosure is not limited to such embodiments. The systems and methods described herein may be used with any storage interface, including Small Computer System Interface (SCSI), Peripheral Component Interconnect Express (PCIe), Compute Express Link (CXL), remote direct memory access (RDMA) over Ethernet, Serial Advanced Technology Attachment (SATA), Fiber Channel, Serial Attached SCSI (SAS), NVMe over Fabrics (NVMe-oF), or the like. Moreover, the systems and methods described herein may be used with storage interfaces that may be developed and documented in the future. In some embodiments, the storage interface includes an input-output size limit or an analogous aspect of data-distribution dependent input-output performance.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1-35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A method, comprising:

receiving, from an application, a memory allocation request, the memory allocation request comprising:

a number of blocks, and a first address;

determining that memory at the first address is allocated;

identifying a second address, differing from the first address by less than a first threshold; and allocating the number of blocks of memory at the second address.

2. The method of statement 1, wherein:

the memory is nonvolatile memory in a storage device, and the method further comprises calculating the first threshold based on the first address and on an input-output size limit of the storage device.

3. The method of statement 1 or statement 2, wherein:

the memory is nonvolatile memory in a storage device compatible with an interface protocol, the interface protocol provides for reporting of an input-output size limit of the storage device, and the method further comprises calculating the first threshold based on the first address and on the input-output size limit.

4. The method of any one of the preceding statements, wherein the determining that memory at the first address is allocated comprises searching a data structure for an entry indexed by the first address.

5. The method of any one of the preceding statements, wherein the determining that memory at the first address is allocated comprises searching a data structure for an entry indexed by the first address, the data structure being configured to be searched in logarithmic time.

6. The method of any one of the preceding statements, wherein:

the memory allocation request further comprises a second address; and the memory is nonvolatile memory in a storage device, and the method further comprises calculating the first threshold based on:

the first address, the second address, and an input-output size limit of the storage device.

7. The method of any one of the preceding statements, wherein:

the determining that memory at the first address is allocated comprises searching a first data structure for an entry indexed by the first address; and the identifying of the second address comprises searching a second data structure for an entry indexed by the number of blocks.

8. The method of any one of the preceding statements, wherein:

the determining that memory at the first address is allocated comprises searching a first data structure for an entry indexed by the first address;

the identifying of the second address comprises searching a second data structure for an entry indexed by the number of blocks; and the second data structure stores, at an indexed node, one or more addresses of free regions of memory.

9. A system, comprising:

a processing circuit; and memory, operatively connected to the processing circuit and storing instructions that, when executed by the processing circuit, cause the system to perform a method, the method comprising:

receiving, from an application, a memory allocation request, the memory allocation request comprising:

a number of blocks, and a first address;

determining that memory at the first address is allocated;

identifying a second address, differing from the first address by less than a first threshold; and allocating the number of blocks of memory at the second address.

10. The system of statement 9, wherein:
the memory is nonvolatile memory in a storage device, and
the method further comprises calculating the first threshold based on the first address and on an input-output size limit of the storage device.
11. The system of statement 9 or statement 10, wherein:
the memory is nonvolatile memory in a storage device compatible with an interface protocol,
the interface protocol provides for reporting of an input-output size limit of the storage device, and
the method further comprises calculating the first threshold based on the first address and on the input-output size limit.
12. The system of any one of statements 9 to 11, wherein the determining that memory at the first address is allocated comprises searching a data structure for an entry indexed by the first address.
13. The system of any one of statements 9 to 12, wherein the determining that memory at the first address is allocated comprises searching a data structure for an entry indexed by the first address, the data structure being configured to be searched in logarithmic time.
14. The system of any one of statements 9 to 13, wherein:
the memory allocation request further comprises a second address; and
the memory is nonvolatile memory in a storage device, and
the method further comprises calculating the first threshold based on:
the first address,
the second address, and
an input-output size limit of the storage device.
15. The system of any one of statements 9 to 14, wherein:
the determining that memory at the first address is allocated comprises searching a first data structure for an entry indexed by the first address; and
the identifying of the second address comprises searching a second data structure for an entry indexed by the number of blocks.
16. The system of any one of statements 9 to 15, wherein:
the determining that memory at the first address is allocated comprises searching a first data structure for an entry indexed by the first address;
the identifying of the second address comprises searching a second data structure for an entry indexed by the number of blocks; and
the second data structure stores, at an indexed node, one or more addresses of free regions of memory.
17. A system, comprising:
a computer-readable medium storing instructions that, when executed by one or more processing circuits, cause the one or more processing circuits to:
execute an application, the application being configured to call an allocation request method of a block allocator, the allocation request method taking, as arguments:
a number of blocks, and
a first address;
the computer-readable medium further storing instructions that, when executed by the one or more processing circuits, cause the one or more processing circuits to execute the allocation request method, executing of the allocation request method comprising:
determining that memory at the first address is allocated;
identifying a second address, differing from the first address by less than a first threshold; and
allocating the number of blocks of memory at the second address.
18. The system of statement 17, wherein:
the memory is nonvolatile memory in a storage device, and
the method further comprises calculating the first threshold based on the first address and on an input-output size limit of the storage device.
19. The system of statement 17 or statement 18, wherein:
the memory is nonvolatile memory in a storage device compatible with an interface protocol,
the interface protocol provides for reporting of an input-output size limit of the storage device, and
the method further comprises calculating the first threshold based on the first address and on the input-output size limit.
20. The system of any one of statements 17 to 19, wherein the determining that memory at the first address is allocated comprises searching a data structure for an entry indexed by the first address.

Although exemplary embodiments of a block allocator have been specifically described and illustrated herein, many modifications and variations will be apparent to those skilled in the art. Accordingly, it is to be understood that a block allocator constructed according to principles of this disclosure may be embodied other than as specifically described herein. The invention is also defined in the following claims, and equivalents thereof.

What is claimed is:
1. A method, comprising:
receiving, from an application, a memory allocation request corresponding to requesting an allocation, the memory allocation request comprising:
a number of blocks, the number of blocks being a size of the requested allocation, in blocks, and
a first address;
determining that memory at the first address is allocated;
identifying a second address, differing from the first address by less than a first threshold, the first threshold based at least on an input-output size limit of a storage device comprising the memory; and
allocating the number of blocks of memory at the second address.
2. The method of claim 1, wherein:
the memory is nonvolatile memory in a storage device, and
the method further comprises calculating the first threshold based on the first address and on an input-output size limit of the storage device.
3. The method of claim 1, wherein:
the memory is nonvolatile memory in a storage device compatible with an interface protocol,
the interface protocol provides for reporting of an input-output size limit of the storage device, and
the method further comprises calculating the first threshold based on the first address and on the input-output size limit.
4. The method of claim 1, wherein the determining that memory at the first address is allocated comprises searching a data structure for an entry indexed by the first address.
5. The method of claim 1, wherein the determining that memory at the first address is allocated comprises searching a data structure for an entry indexed by the first address, the data structure being configured to be searched in logarithmic time.

6. The method of claim 1, wherein:
the memory allocation request further comprises a second address; and
the memory is nonvolatile memory in a storage device, and
the method further comprises calculating the first threshold based on:
the first address,
the second address, and
an input-output size limit of the storage device.

7. The method of claim 1, wherein:
the determining that memory at the first address is allocated comprises searching a first data structure for an entry indexed by the first address; and
the identifying of the second address comprises searching a second data structure for an entry indexed by the number of blocks.

8. The method of claim 1, wherein:
the determining that memory at the first address is allocated comprises searching a first data structure for an entry indexed by the first address;
the identifying of the second address comprises searching a second data structure for an entry indexed by the number of blocks; and
the second data structure stores, at an indexed node, one or more addresses of free regions of memory.

9. A system, comprising:
a processing circuit; and
memory, operatively connected to the processing circuit and storing instructions that, when executed by the processing circuit, cause the system to perform a method, the method comprising:
receiving, from an application, a memory allocation request, the memory allocation request comprising:
a number of blocks, the number of blocks being a size of a requested allocation, in blocks, and
a first address;
determining that memory at the first address is allocated;
identifying a second address, differing from the first address by less than a first threshold, the first threshold based at least on an input-output size limit of a storage device comprising the memory; and
allocating the number of blocks of memory at the second address.

10. The system of claim 9, wherein:
the memory is nonvolatile memory in a storage device, and
the method further comprises calculating the first threshold based on the first address and on an input-output size limit of the storage device.

11. The system of claim 9, wherein:
the memory is nonvolatile memory in a storage device compatible with an interface protocol,
the interface protocol provides for reporting of an input-output size limit of the storage device, and
the method further comprises calculating the first threshold based on the first address and on the input-output size limit.

12. The system of claim 9, wherein the determining that memory at the first address is allocated comprises searching a data structure for an entry indexed by the first address.

13. The system of claim 9, wherein the determining that memory at the first address is allocated comprises searching a data structure for an entry indexed by the first address, the data structure being configured to be searched in logarithmic time.

14. The system of claim 9, wherein:
the memory allocation request further comprises a second address; and
the memory is nonvolatile memory in a storage device, and
the method further comprises calculating the first threshold based on:
the first address,
the second address, and
an input-output size limit of the storage device.

15. The system of claim 9, wherein:
the determining that memory at the first address is allocated comprises searching a first data structure for an entry indexed by the first address; and
the identifying of the second address comprises searching a second data structure for an entry indexed by the number of blocks.

16. The system of claim 9, wherein:
the determining that memory at the first address is allocated comprises searching a first data structure for an entry indexed by the first address;
the identifying of the second address comprises searching a second data structure for an entry indexed by the number of blocks; and
the second data structure stores, at an indexed node, one or more addresses of free regions of memory.

17. A system, comprising:
a computer-readable medium storing instructions that, when executed by one or more processing circuits, cause the one or more processing circuits to:
execute an application, the application being configured to call an allocation request method of a block allocator, the allocation request method taking, as arguments:
a number of blocks, the number of blocks being a size of a requested allocation, in blocks, and
a first address;
the computer-readable medium further storing instructions that, when executed by the one or more processing circuits, cause the one or more processing circuits to execute the allocation request method, executing of the allocation request method comprising:
determining that memory at the first address is allocated;
identifying a second address, differing from the first address by less than a first threshold, the first threshold based at least on an input-output size limit of a storage device comprising the memory; and
allocating the number of blocks of memory at the second address.

18. The system of claim 17, wherein:
the memory is nonvolatile memory in a storage device, and
the method further comprises calculating the first threshold based on the first address and on an input-output size limit of the storage device.

19. The system of claim 17, wherein:
the memory is nonvolatile memory in a storage device compatible with an interface protocol,
the interface protocol provides for reporting of an input-output size limit of the storage device, and
the method further comprises calculating the first threshold based on the first address and on the input-output size limit.

20. The system of claim 17, wherein the determining that memory at the first address is allocated comprises searching a data structure for an entry indexed by the first address.

* * * * *